(No Model.) 2 Sheets—Sheet 1.

E. R. LUCAS.
MACHINE FOR AMALGAMATING ORES.

No. 272,726. Patented Feb. 20, 1883.

Witnesses.
A. Ruppert
J. P. Town

Inventor.
E. R. Lucas
Holloway & Blanchard
Attys (No Model.) 2 Sheets—Sheet 2.
E. R. LUCAS.
MACHINE FOR AMALGAMATING ORES.
No. 272,726. Patented Feb. 20, 1883.
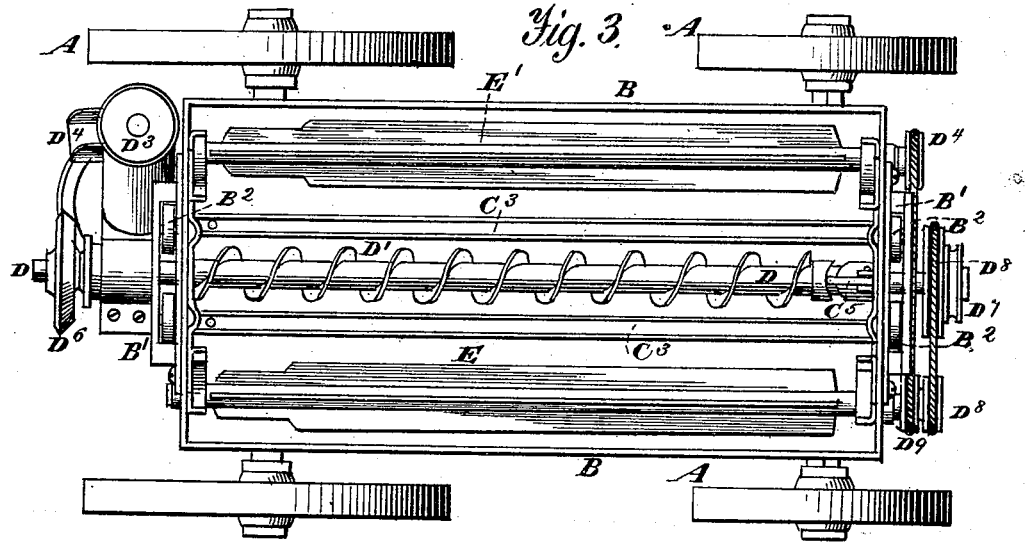
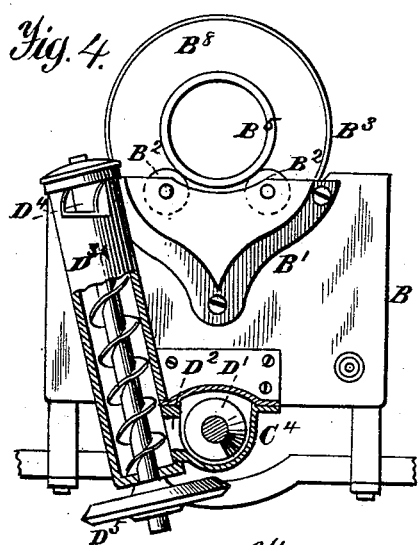
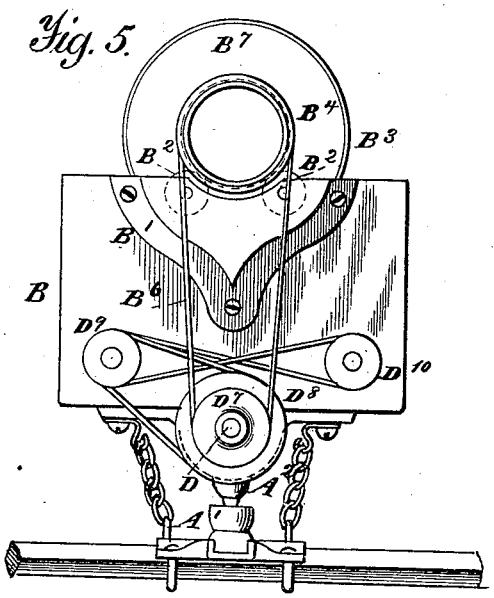
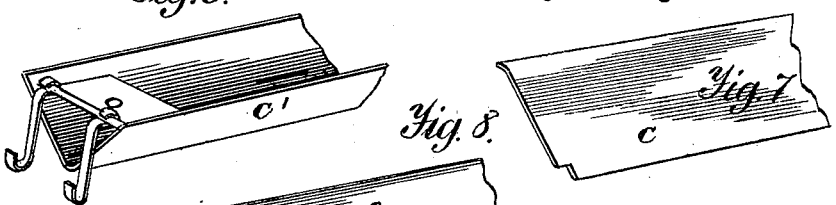
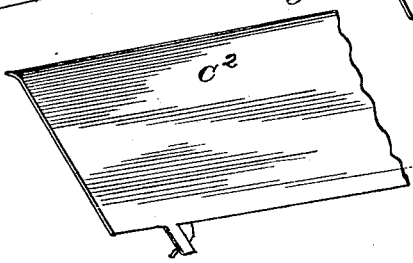
Witnesses.
A. Ruppert,
J. T. Town
Inventor:
E. R. Lucas
Holloway & Blanchard
Attys.

UNITED STATES PATENT OFFICE.

EDWARD R. LUCAS, OF PEORIA, ILLINOIS, ASSIGNOR OF ONE-HALF TO
WILLIARD W. LIND, OF SAME PLACE.

MACHINE FOR AMALGAMATING ORES.

SPECIFICATION forming part of Letters Patent No. 272,726, dated February 20, 1883.

Application filed July 27, 1882. (No model.)

*To all whom it may concern:*

Be it known that I, EDWARD R. LUCAS, a citizen of the United States of America, residing at Peoria, in the county of Peoria and State of Illinois, have invented certain new and useful Improvements in Machines for Amalgamating Ores, of which the following is a specification, reference being had therein to the accompanying drawings.

My invention relates to improvements in machines designed principally for use in placer-mining; and the objects of my improvements are the production of certain new and useful devices and combinations thereof for the separation of gold, which is capable of being acted upon by amalgam or amalgam-plates from auriferous sands, gravel, or pulverized rock. I attain the objects sought by the devices and combinations thereof illustrated in the accompanying drawings, in which—

Figure 1:
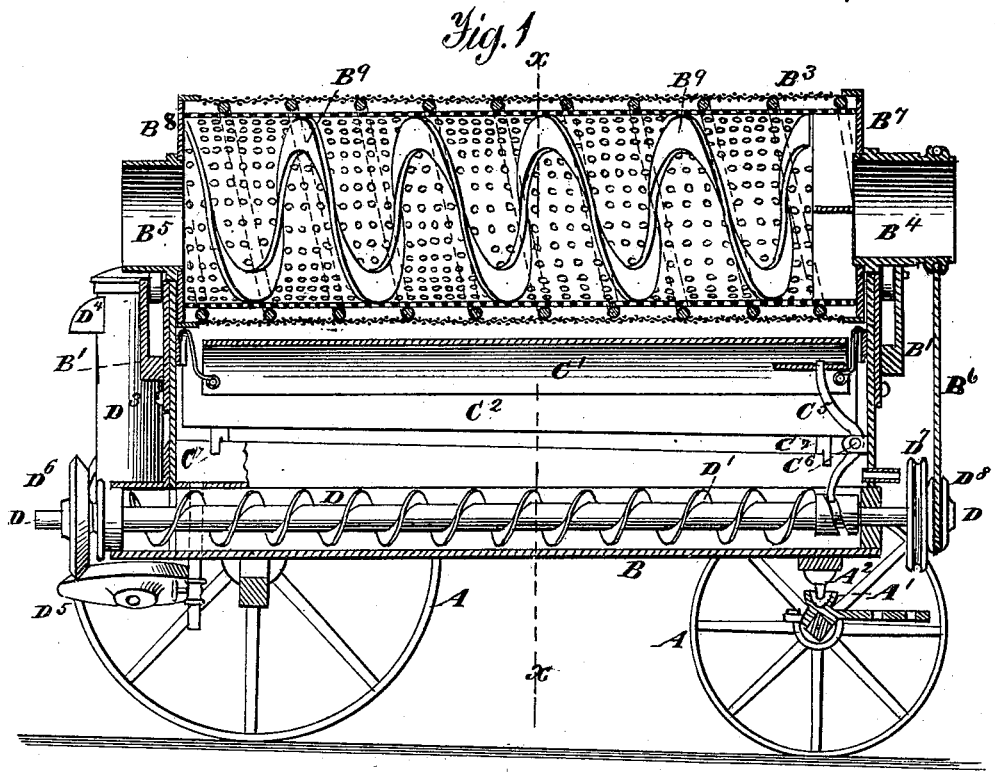
Figure 2:
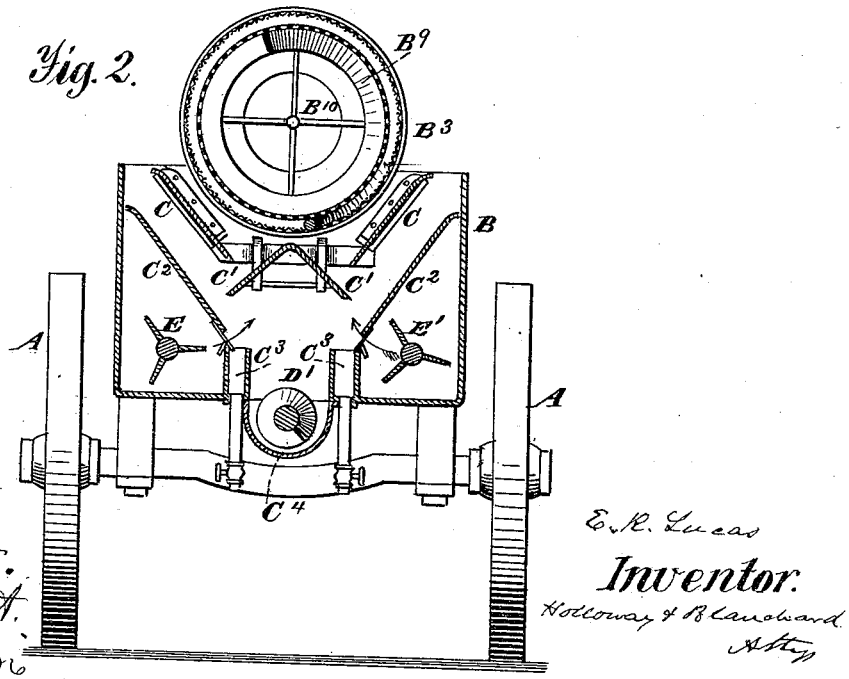

Figure 1 is a vertical longitudinal section of my improved machine, showing carrying-wheels, an iron tank, a revolving cylinder into which the material to be treated is placed, a conveyer therein for moving the material, a conveyer in the lower portion of the tank, a vertical conveyer for elevating the sand or other substance after it has been deprived of its valuable portions, and a belt, pulleys, and wheels for driving the cylinder and conveyer. Fig. 2 is a transverse section on line $x\ x$ of Fig. 1, showing the cylinder and conveyer above alluded to, the tank, the amalgam-plates, (one of which is reciprocating,) water-agitators, and one pair of the carrying-wheels. Fig. 3 is a plan view, showing the parts above enumerated, with the exception of the cylinder and belts for driving the moving parts. Fig. 4 is a rear end view, showing the cylinder for receiving the material and the rollers upon which it is placed and their supports, the horizontal and vertical conveyers, and a portion of the rear axle. Fig. 5 is a front end view, showing the cylinder, pulley, belts, and driving-pulleys for driving the cylinder, the water-agitators and conveyer, a portion of the front axle, and the means of connecting the tank therewith. Fig. 6 is a perspective view, showing a portion of the oscillating amalgamating-plate and the means for attaching it to the tank. Fig. 7 is a view of a portion of one of the amalgamating-plates, showing one of the shoulders upon which it rests; and Fig. 8 is a similar view, showing the means for supporting the side plates upon the gold-receiving chambers.

Similar letters refer to similar parts throughout the several views.

It frequently occurs that rich deposits of auriferous sand, gravel, and rock are found in localities where but small quantities of water can be had for washing them, and hence my present invention is designed to provide a means for causing a separation of the gold from such foreign substances in such and other localities, its construction being such as to enable the operator to make the separation by the use of a small quantity of water.

In constructing an apparatus embodying my improvements, I prefer to mount it upon suitable carrying-wheels, A, for convenience in moving it from place to place. The larger or hind wheels revolve upon an axle fixed rigidly to the tank B, while the smaller or forward ones revolve upon an axle which carries a socket, A', into which a pivot, A², enters, it being firmly fixed to the tank or any other suitable device that will allow the front running-gear to turn under the machine, to permit its being run as a common wagon is, by which arrangement the machine can be drawn over roads or fields and turned from a straight course like a common wagon.

Upon the wheels and axles just alluded to the tank B, made of wood or of metal, is placed.

To the ends of the tank are secured brackets B' B', in which there are journaled friction-rolls B² B², two in each bracket, which are so arranged as to form the supports of a cylinder, B³, which is provided with hollow journals B⁴ and B⁵, the surfaces of which rest upon said rollers and turn freely thereon, said cylinder being driven by a belt, B⁶, from a shaft below it, as shown in Fig. 1. This cylinder is composed of heads B⁷ B⁸, to which the journals are attached, or which may form a part thereof, said heads being provided with an inwardly-projecting flange upon their outer surfaces, to which there is secured the outer covering of the cylinder, which consists of wire-gauze or of foraminous sheet metal having small perforations. Within the wire-gauze there is placed a coil of wire, or it may be a strip of sheet metal placed edgewise, brass being preferred, which extends the entire length thereof, the diameter of the coil being of the proper size to admit of it being passed into the gauze covering, for which it forms a support and keeps it properly extended. Within the coil just alluded to there is placed another cylinder of foraminous sheet metal, which is of sufficient thickness and strength to enable it to support the sand, gravel, or broken rock placed in it for treatment, such material being supplied to the forward end of the cylinder through the journal $B^4$, at which time there may be introduced a small quantity of water, if desired; but this is not absolutely necessary, as the lower portion of the cylinder usually moves through the water in the tank, and if it should not the operation of the device would not be seriously affected.

For the purpose of carrying the material from the point where it is introduced into the cylinder to its opposite end, where the worthless portions of it are discharged, there is placed within the inner foraminous cylinder a conveyer, $B^9$, which is in the form of a roller, and consequently each revolution thereof advances the material toward the discharging-point, which is through the journal $B^5$.

As a means of distributing the material as it is introduced, there is placed in the cylinder a spreader, $B^{10}$, which has four arms, between which it passes and by which it is divided upon entering.

The operation of this part of the machine is as follows: The cylinder being caused to rotate, the auriferous substance is fed to it, and the coarser portions are carried forward by the conveyer $B^9$, leaving the metal and fine particles of the sand to be passed through the two foraminous cylinders and deposited upon plates $C$, $C'$, and $C^2$, which may have plain surfaces, as shown, or they may be corrugated in the direction of the length, if preferred. These plates are to be covered with an amalgam that will retain the particles of gold for a sufficient length of time to cause its separation from the sand or other foreign substance which has passed through the cylinder with it, after which it will be deposited in receptacles $C^3$ $C^3$, formed in the bottom of the tank for its reception, as shown in Fig. 2, its greater gravity carrying it there, while the sand and dirt passing over said plates is by the force of currents of water which pass through the spaces between the lower edges of the plates $C^2$ $C^2$ and the receivers $C^3$ forced into the central portion of the tank, where it falls down into a receptacle, $C^4$, formed for its reception.

For the purpose of causing the material to pass from the plates $C$ $C$ to the plates $C'$ $C'$ with sufficient rapidity to prevent them and the plates $C^2$ $C^2$ from becoming fouled or too heavily loaded, the latter, $C^2$ $C^2$, which are of the form shown in Fig. 2, are suspended at the ends by straps or rods hooked into staples or eyes places upon the ends of the tank and kept in a properly-inclined position by the guides $C^7$, and are caused to vibrate longitudinally by means of a lever, $C^5$, pivoted to the tank at $C^6$, its lower end working in a cam-formed groove formed in a hub or disk placed upon the shaft D, while its upper end passes through an aperture formed in one of the plates $C'$, by which means the material is forced to leave said plates, and thus prevent them from becoming too heavily loaded.

The shaft D, above alluded to, has its bearing in the ends of the tank and carries a worm or screw, $D'$, to which the proper direction is given in its revolutions to cause the sand or other earthy matter deposited in the receptacle $C^4$ to be carried to the rear end of the machine, where it is delivered into a vertical conveyer, $D^3$, through an aperture, $D^2$. (Shown in Fig. 4.) This vertical conveyer raises the material and elevates it to a sufficient height to admit of its being delivered into a chute or trough and carried away from the machine, it being driven by a gear or blank friction-wheel, $D^5$, placed upon the rearward outer end of the shaft D, which may be driven by any convenient motor, such as steam, horse, or wind power. The shaft D is provided with pulleys $D^7$ and $D^8$ upon its opposite end, over the latter of which the belt which drives the cylinder $B^3$ passes, while from the former a belt passes to and over a pulley, $D^9$, and drives a water-agitator, soon to be described. From pulley $D^9$ a belt passes to a pulley, $D^{10}$, which drives another water-agitator upon the opposite side of the tank B.

The water-agitators just alluded to are designated by the letters E and $E'$, they being located in the tank at points between its bottom and sides and under the plates $C^2$ $C^2$, their office being to create currents of water through the spaces left between said plates and the upper surface of the reservoirs or receptacles $C^3$, for the purpose of forcing away the sand and dirt that would otherwise fall into the receptacle $C^3$, in order that they may be disposed of, as hereinbefore described.

Having thus described my invention, what I claim, and desire to secure by Letters Patent, is—

1. In an amalgamating-machine, a horizontal revolving cylinder, of uniform diameter, provided with journals which are made hollow and smooth, a perforated metal outer covering provided with a supporting spiral wire, an inner foraminous cylinder of uniform diameter, a continuous screw or worm for carrying the coarse particles to the outlet, and suitable mechanism for driving the same, combined with a tank, the amalgam-plates $C$ $C$ $C'$ $C'$, movable amalgam-plates $C^2$ $C^2$, and means for reciprocating said plates $C^2$ $C^2$ parallel with the sides of said tank and cylinder for separating the metal from the sand and dirt that is placed in the cylinder for treatment, substantially as and for the purpose set forth.

2. The combination, in a machine for amalgamating auriferous substances, of a revolving cylinder, a tank for the reception of the water and material to be separated, a series of courses, C C C' C' C² C², of amalgam-plates, and means for reciprocating the plates C² C² parallel with the tank, substantially as and for the purpose set forth.

3. The combination, with the water-tank B, of the amalgamated plates C', suspended as described, lever C⁵, and the conveyer D D', having the grooved cam, substantially as and for the purpose set forth.

4. The tank B, provided with the inclined amalgamated plates C² and receptacles C³, as described, whereby a longitudinal open space is formed, in combination with the amalgamated plates C', screen B³, and agitators E E', and means for operating the same, all substantially as set forth.

5. The tank B, provided with water-agitators E E', combined with the longitudinally-moving plates C²C², provided with guides C⁷C⁷, the receptacles C³ C³ and C⁴, and the mechanism, as described, for operating said agitators and plates, substantially as shown and specified.

In testimony whereof I affix my signature in presence of two witnesses.

EDWARD R. LUCAS.

Witnesses:
J. LUCAS,
HENRY W. TOMINGS.